Figure 1:
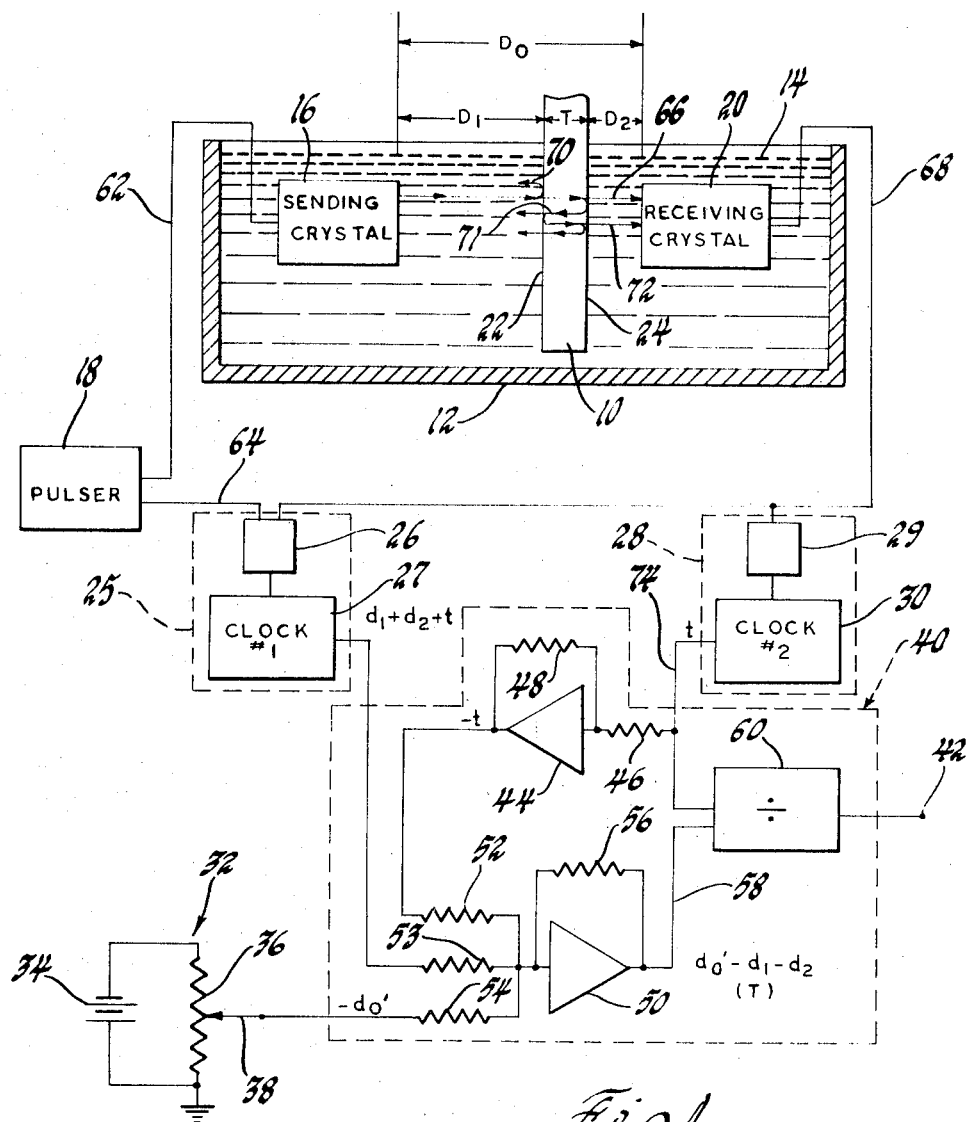

United States Patent

Eichler

[15] 3,690,155

[45] Sept. 12, 1972

[54] APPARATUS FOR MEASURING SOUND VELOCITY IN A WORKPIECE

[72] Inventor: Richard H. Eichler, Flint, Mich.

[73] Assignee: General Motors Corporation, Detroit, Mich.

[22] Filed: Oct. 30, 1970

[21] Appl. No.: 85,558

[52] U.S. Cl. .............................................. 73/67.5 R
[51] Int. Cl. ........................... G01n 29/00, G01h 5/00
[58] Field of Search ............................. 73/67.5–67.8

[56] References Cited

UNITED STATES PATENTS

| 3,003,351 | 10/1961 | Ziegler et al. | 73/67.5 R |
| 3,603,136 | 9/1971 | Diamond et al. | 73/67.8 |
| 3,554,014 | 1/1971 | Berg et al. | 73/67.8 |

Primary Examiner—Richard C. Queisser
Assistant Examiner—John P. Beauchamp
Attorney—Paul Fitzpatrick

[57] ABSTRACT

A method and apparatus for determining the velocity of sound in a workpiece. The workpiece is placed between sending and receiving electroacoustic transducers that are spaced a predetermined distance in a sound transmitting medium. The sending electroacoustic transducer is pulsed so as to generate acoustic impulses directed toward the receiving electroacoustic transducer, which detects both the impulse and a delayed image of the impulse. A first signal that is proportional to the elapsed time between the generation and the detection of an impulse and a second signal that is proportional to the elapsed time between the detection of the impulse and the detection of the delayed image of the impulse are combined by a signal gen-erating network with a third signal that is proportional to the time that is required for sound to travel the predetermined distance in the medium so as to produce an output signal which is proportional to the velocity of the impulse through the workpiece.

6 Claims, 2 Drawing Figures

INVENTOR.
Richard H. Eichler
BY
Paul Fitzpatrick
ATTORNEY

APPARATUS FOR MEASURING SOUND VELOCITY IN A WORKPIECE

This invention relates to acoustic test apparatus and, more particularly, to a method and apparatus for ultrasonically determining the velocity of sound in a workpiece.

Acoustic testing has become important in many manufacturing operations, primarily in the field of quality control, because of its nondestructive nature and because the test times required are conducive to high volume testing on a production line. While acoustic testing is often employed to detect flaws in a manufactured article it may also be employed advantageously where the velocity of sound in a workpiece is related to the physical characteristics of the workpiece. For example, the physical characteristics of articles which are made of nodular iron are greatly influenced by the percent of the graphite particles in the iron which are in spherical, or nodular, form. Since the velocity of sound in a nodular iron workpiece is indicative of the percent of the graphite particles which are in spherical form within the workpiece the velocity of sound in a nodular iron workpiece may be employed as an indication of the workpiece's physical characteristics.

While various test methods have heretofore been proposed to determine the velocity of sound in a workpiece, and hence predict the physical characteristics of the workpiece, these earlier test methods have generally necessitated either positioning the workpiece at a certain distance from an electroacoustic transducer or have required the use of two electroacoustic transducers that each generate and detect acoustic impulses. A shortcoming of the former test method is that the workpiece configuration and required positioning of the workpiece relative to the electroacoustic transducer are not conducive to high volume production line test techniques. A shortcoming of the latter test method is that inconsistently orienting workpieces relative to the electroacoustic transducers may result in erroneously indicating the velocity of sound in the workpiece inasmuch as the distances between the electroacoustic transducers and the workpiece, as determined by the reflection of acoustic impulses from the workpiece, vary as the angle of the workpiece relative to the electroacoustic transducers is varied.

It is, therefore, an object of the subject invention to provide a method of measuring the velocity of sound in a workpiece that is positioned between a first electroacoustic transducer that generates acoustic impulses and a second electroacoustic transducer that detects the acoustic impulses and delayed images of the acoustic impulses after they have passed through the workpiece.

It is another object of this invention to provide apparatus which employs a first electroacoustic transducer for generating acoustic impulses and a second electroacoustic transducer for detecting the acoustic impulses and delayed images of the acoustic impulses after they have passed through a workpiece, the first electroacoustic transducer serving only to generate the acoustic impulses and the second electroacoustic transducer serving only to detect the acoustic impulses.

Figure 2:
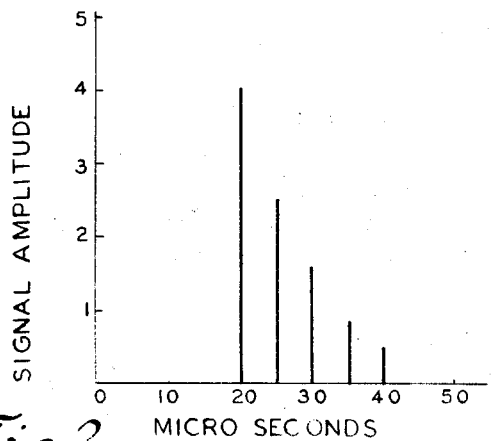

The foregoing and other objects and advantages of the subject invention will become more apparent from the following description and the accompanying drawings, in which:

FIG. 1 is a schematic diagram of test apparatus incorporating the principles of the subject invention, and FIG. 2 is a graph showing signals which are generated by an electroacoustic transducer in FIG. 1 when the electroacoustic transducer detects acoustic impulses that have traveled through a workpiece.

As shown in FIGURE 1, apparatus for indicating the velocity of sound through a workpiece 10 includes a reservoir 12 which contains a sound transmitting medium 14, such as water. The workpiece 10 is immersed in the water 14 between a first electroacoustic transducer 16, which generates acoustic impulses when electrically pulsed by a pulser 18, and a second electroacoustic transducer 20, which detects the acoustic impulses and their delayed images after they have passed through the workpiece 10. As persons versed in the art will appreciate, acoustic impulses which are in the ultrasonic range are most readily employed in acoustic test apparatus since the high frequency and short duration of such pulses are readily generated and detected. The first electroacoustic transducer 16 is therefore preferably of a crystal type which generates ultrasonic impulses when stimulated by an electrical pulse of the proper magnitude, the pulse being generated by the pulser 18. Similarly, the second electroacoustic transducer 20 is also preferably of a crystal type which generates electrical signals when mechanically stimulated by ultrasonic impulses that are generated by the first crystal 16 and transmitted through the water 14 and the workpiece 10 to the second crystal 20. By way of example, and without limitation, the pulser 18 may be the model PC10800 unit manufactured by the Branson Instruments Company of Stanford, Connecticut. While the crystals which give optimum performance when used as the crystals 16 and 20 will vary in accordance with the particular arrangement of the test apparatus, as persons versed in the art will appreciate, satisfactory results in a typical test performed on nodular iron castings have been obtained using crystals having a ¾ inch diameter and an operational frequency of 10 megacycles as the crystals 16 and 20.

It should be noted at this time that, as persons versed in the art will appreciate, a crystal such as the crystals 16 and 20 vibrates when stimulated by either an electrical signal or an acoustic impulse. The first crystal 16 thus actually generates a burst of several impulses when stimulated by a single pulse that is generated by the pulser 18. Similarly, the second crystal 20 actually detects a burst of impulses rather than a single impulse. However, the discrete impulses comprising each burst of impulses generated by the first crystal 16 when the first crystal 16 is stimulated by a pulse train are at a much higher frequency than the frequency of the pulse train. It is therefore convenient to treat each burst of discrete acoustic impulses as a single impulse, as will hereafter be the case in this description and the accompanying appended claims.

It should also be noted at this time that when an impulse passes from the first crystal 16 to the second crystal 20 a portion of the energy in the impulse is reflected each time the impulse passes through an interface formed by the workpiece 10 and the water 14. This phenomenon is due to the imperfect energy transfer through such an interface. Accordingly, each time an impulse is generated by the first crystal 16 the second crystal 20 detects not only the impulse but also subsequently detects delayed images of the impulse due to internal reflections of the impulse between the exterior surfaces 22 and 24 of the workpiece, as will subsequently be explained in conjunction with FIG. 2. It is thus convenient to define as "delayed images" the reflected energy impulses that are detected by the second crystal 20.

The subject apparatus also includes a first clock network 25, which is comprised of an amplifier 26 and a clock 27, for generating a first voltage signal that is proportional to the elapsed time between the generation of an impulse by the first crystal 16 and the detection of the impulse by the second crystal 20. A second clock network 28, which is comprised of an amplifier 29 and a clock 30, is provided for generating a second voltage signal that is proportional to the elapsed time between the detection of the impulse and the detection of the first delayed image of the impulse. As will subsequently be explained, the second voltage signal is proportional to the time that is required for sound to travel through the workpiece 10. While the clock networks 25 and 28 may be of any type which generates an output voltage signal that is proportional to the time between two input signals, as will subsequently be explained, each of the clock networks 25 and 28 may be comprised of a model PC9300A unit, which is also obtainable form the Branson Instruments Company.

In addition, the subject apparatus includes a reference voltage network 32, consisting of a battery 34 and a potentiometer 36 having a wiper arm 38, which is provided for generating a third voltage signal that is proportional to the time that would be required for sound to travel through the medium from the first crystal 16 to the second crystal 20 in the absence of the workpiece 10. A voltage generating network 40 is also provided for combining the first, second, and third voltage signals in a predetermined fashion to generate an output signal at a terminal 42 that is proportional to the velocity of sound in the workpiece 10.

As shown in FIG. 1, the voltage generating network 40 includes a first operational amplifier 44 having an input resistor 46 and a feedback resistor 48 for inverting the polarity of the second voltage signal and a second operational amplifier 50 having input resistors 52, 53, and 54 and a feedback resistor 56 for combining the inverted second voltage signal with the first and third voltage signals so as to generate a fourth voltage signal on a lead 58 that is proportional to their algebraic sum. The voltage generating network 40 also includes a divider 60 for dividing the fourth voltage signal by the second voltage signal so as to generate a fifth voltage signal that is the output signal applied to the terminal 42, as will now be explained.

The velocity of an object, or in this case an acoustic impulse, is equal to the distance through which the impulse travels divided by the time required for the impulse to travel through the distance. The velocity of an acoustic impulse in the workpiece 10 may therefore be determined by ascertaining the thickness of the workpiece 10 and dividing the workpiece 10 thickness by the time required for an acoustic impulse to travel through the workpiece 10. This is the principle on which the subject apparatus operates.

To determine the velocity of sound in the workpiece 10 the first and second crystals 16 and 20 are placed at a predetermined distance $D_0$ apart in the water 14 and the workpiece 10 is placed between the first and second crystals 16 and 20. Since the workpiece 10 has a finite thickness T, the distances form the first and second crystals 16 and 20 to the workpiece 10 are the distances $D_1$ and $D_2$, respectively, as illustrated in FIG. 1. For descriptive purposes lower case symbols corresponding to the distances $D_0$, $D_1$, $D_2$, and T may be used to represent the time required for sound to travel through each of the respective distances. For example, the time $d_1$ represents the time required for sound to traverse the distance $D_1$ and the time t represents the time required for sound through the workpiece 10 to travel the distance T through the workpiece 10. By determining the distance T and the time t the velocity of sound through the workpiece 10 may be determined by merely dividing the distance T by the time $t$, as will now be explained.

The pulser 18 in the illustrated embodiment is a free running oscillator which applies a first pulse train to the first crystal 16 through a lead 62 and a second pulse train through a lead 64 to the first clock network 25. Each time the pulser 18 applies a pulse to the first crystal 16 the first crystal 16 generates an impulse directed toward the second crystal 20. While some of the energy in the impulse is reflected at each of the surfaces 22 and 24 of the workpiece 10 sufficient energy remains in the impulse for it to be detected by the second crystal 20, as illustrated in FIG. 1 by an arrow 66. When the impulse is detected by the second crystal 20 the resultant vibrations of the second crystal 20 cause it to generate a voltage pulse that is applied through a lead 68 to the clock networks 25 and 28.

The energy which the impulse loses on passing into the workpiece 10 through the surface 22, as shown by an arrow 70, is redirected toward the first crystal 16 and dispersed in the water 14. However, the energy which the impulse loses at the interface of the surface 24 is reflected within the workpiece 10 toward the surface 22, as shown by an arrow 71. At the surface 22 some of this reflected energy is again reflected toward the surface 24 and is transmitted as shown by an arrow 72 through the surface 24 to the second crystal 20, which detects the reflected energy as a delayed image of the impulse and generates a voltage pulse having a smaller magnitude than that which the second crystal 20 generated when it detected the original impulse. The second crystal 20 thus transmits a series of voltage pulses, as shown in FIG. 2, through the lead 68 to the clock networks 25 and 28 when it detects the impulse and the delayed images of the impulse. While FIG. 2 is presented for illustrative purposes only, it portrays how in a typical test the second crystal 20 generates a series of voltage pulses that are uniformly spaced and of decreasing amplitude.

The first clock network 25 is programmed to begin counting when it is pulsed by the pulser 18 through the lead 64 and to stop counting when it is pulsed by the second crystal 20 through the lead 68. The first clock network 25 is therefore counting only while the impulse passes from the first crystal 16 to the second crystal 20. The first voltage signal generated by the first clock network 25 is thus proportional to the time $d_0$, which is the sum of the times $d_1$, $d_2$, and $t$. Each time a subsequent impulse is generated by the first crystal 16, the pulser 18 applies a subsequent pulse to the first clock network 25 that serves to both reset the first clock network 25 and to initiate another period in which the first clock network 25 is counting.

The voltage pulses that are generated by the second crystal 20, as shown in FIG. 2, are applied to the second clock network 28 so that the output voltage generated by the second clock network 28 is proportional to the time $t$ required for sound to travel through the workpiece 10. The time which elapses between the generation of the impulse by the first crystal 16 and the detection of the impulse by the second crystal 20 equals the sum of the times $d_1$, $d_2$, and $t$. Similarly, the time which elapses between the generation of the impulse and the detection of the first delayed image of the impulse by the second crystal 20 equals the sum of the times $d_1$, $d_2$, and $3t$. It is thus apparent that the elapsed time between the detection of the impulse by the second crystal 20 and the detection of the first delayed image of the impulse is directly proportional to the time $t$. Accordingly, the sensitivity of the second clock network 28 may be established, as is apparent to those skilled in the art, so that the pulse generated by the second crystal 20 when the impulse is detected resets the second clock network 28, which starts the second clock network 28 counting, and the pulse generated by the second crystal 20 when the first delayed image of the impulse is detected stops the counting sequence of the second clock network 28. The second clock network 28 is thus counting only during the time between the detection of the impulse by the second crystal 20 and the detection of the first delayed image of the impulse by the second crystal 20. The second voltage signal which is generated by the second clock network 28 and applied to a lead 74 is therefore proportional to the time $t$.

To generate the third voltage signal, which as previously explained, is proportional to the time $d_0'$ that would be required for an impulse to travel the distance $D_0$ if the workpiece 10 were removed from the water 14, the wiper arm 38 of the potentiometer 36 is positioned so that it is at a voltage that is proportional to the time $d_0'$. To properly position the wiper arm 38 to have this voltage the time $d_0'$ may be calculated by determining the distance $D_0$ and the velocity of sound in the water 14. An alternate, and preferred, method of determining the time $d_0'$ includes the procedure of removing the workpiece 10 from the water 14, generating an impulse with the first crystal 16, detecting the impulse with the second crystal 20, and employing the first voltage signal generated by the first clock network 25 as an indication of the time $d_0'$.

By grounding the positive terminal of the battery 34 and inverting the second voltage signal in the first operational amplifier 44, the only positive voltage signal that is applied to one of the resistors 52, 53, and 54 is the first voltage signal, which is generated as a positive voltage by the first clock network 25. Accordingly, the voltages which are applied to the resistors 52 through 54 cause the second operational amplifier 50 to add the times $d_1 + d_2 + t$ with $-t$ and $-d_0'$, which is the same as subtracting the times $d_1$ and $d_2$ from the time $d_0'$. The voltage which is generated by the second operational amplifier 50 as the fourth voltage signal on the lead 58 is thus proportional to the distance T. By applying both the second voltage signal, which is proportional to the time $t$ required for sound to travel the distance T through the workpiece 10, and the fourth voltage signal, which is proportional to the distance T, to the proper terminals of the divider 60 the output voltage of the divider 60, which is the fifth voltage signal and is applied to the terminal 42, is proportional to the quotient of the distance T divided by the time $t$. The fifth voltage signal is thus proportional to the velocity of sound in the workpiece 10 and hence may be employed as an indication of the physical characteristics possessed by the workpiece 10.

It is thus apparent that by employing the test method and apparatus herein described one is able to swiftly and accurately determine the velocity of sound in a workpiece without the need for physically contacting the workpiece, though persons versed in the art will appreciate that the subject method and apparatus may be modified without departing from the spirit of the invention.

What is claimed is:

1. Apparatus for indicating the velocity of sound in a workpiece comprising, in combination, a sound transmitting medium, first electroacoustic transducer means for generating an acoustic impulse, second electroacoustic transducer means for detecting both the acoustic impulse and a delayed image of the impulse, the workpiece being positioned in the medium between the first and second electroacoustic transducer means so as to effect transmission of the impulse from the first electroacoustic transducer means through the workpiece to the second electroacoustic transducer means, pulser means for pulsing the first electroacoustic transducer means, thereby causing it to generate the impulse directed toward the second electroacoustic transducer means, first signal generating means responsive to the pulser and the second electroacoustic transducer means for generating a first signal that is proportional to the elapsed time between the generation of the impulse by the first electroacoustic transducer means and the detection of the impulse by the second electroacoustic transducer means, second signal generating means for generating a second signal that is proportional to the elapsed time between the detection of the impulse and the detection of the delayed image of the impulse by the second electroacoustic transducer means, and means responsive to the first and second signals for generating a signal that is proportional to the velocity of sound in the workpiece.

2. Apparatus for indicating the velocity of sound in a workpiece comprising, in combination, a sound transmitting medium, a first electroacoustic transducer positioned in the medium for generating an acoustic impulse, a second electroacoustic transducer positioned in the medium for detecting both the acoustic impulse and a delayed image of the impulse, the workpiece being positioned between the transducers in the medium, pulser means for pulsing the first electroacoustic transducer, thereby causing it to generate the impulse directed toward the second electroacoustic transducer, first signal generating means responsive both to the pulser and to the second electroacoustic transducer for generating a first signal that is proportional to the elapsed time between the generation of the impulse by the first electroacoustic transducer and the detection of the impulse by the second electroacoustic transducer, second signal generating means for generating a second signal that is proportional to the elapsed time between the detection of the impulse and the detection of the delayed image of the impulse by the second electroacoustic transducer, third signal generating means for generating a third signal that is proportional to the time required for sound to travel through the medium for the distance between the first and second electroacoustic transducers, fourth signal generating means responsive to the first, second, and third signals for generating a fourth signal that is proportional to the thickness of the workpiece, and means responsive to the second and fourth signals for generating a signal that is proportional to the velocity of sound in the workpiece.

3. Apparatus for indicating the velocity of sound in a workpiece comprising, in combination, a sound transmitting medium, a first crystal positioned in the medium for generating an acoustic impulse, a second crystal positioned in the medium for detecting both the acoustic impulse and a delayed image of the impulse, the workpiece being positioned between the crystals in the medium so that the impulse travels through the workpiece, pulser means for pulsing the first crystal so as to cause it to generate the impulse directed toward the second crystal, first clock means responsive to the pulser and the second crystal for generating a first signal that is proportional to the elapsed time between the generation of the impulse by the first crystal and the detection of the impulse by the second crystal, second clock means for generating a second signal that is proportional to the elapsed time between the detection of the impulse and the detection of the delayed image of the impulse by the second crystal, the second signal being proportional to the time that is required for sound to pass through the workpiece, means for generating a third signal that is proportional to the time required for sound to travel through the medium for the distance between the transducers, means responsive to the first, second, and third signals for generating a fourth signal that is proportional to the thickness of the workpiece, and means for dividing the fourth signal by the second signal, thereby generating an output signal that is proportional to the velocity of sound in the workpiece.

4. A method for determining the velocity of sound in a workpiece that is positioned between first and second electroacoustic transducers that are spaced a predetermined distance in a sound transmitting medium comprising the steps of generating an acoustic impulse with the first electroacoustic transducer, the impulse being directed so as to pass through the workpiece to the second electroacoustic transducer; detecting the impulse with the second electroacoustic transducer; detecting a delayed image of the impulse with the second electroacoustic transducer; generating a first signal that is proportional to the elapsed time between the generation of the impulse by the first electroacoustic transducer and the detection of the impulse by the second electroacoustic transducer; generating a second signal that is proportional to the elapsed time between the detection of the impulse by the second electroacoustic transducer and the detection of the delayed image of the impulse by the second electroacoustic transducer, the second signal thereby being proportional to the time required for sound to travel through the workpiece; generating a third signal that is proportional to the time required for sound to travel through the medium for the predetermined distance; and generating a signal that is proportional to the velocity of sound in the workpiece by combining the first, second and third signals according to a predetermined algebraic relationship.

5. A method for determining the velocity of sound in a workpiece that is positioned between first and second electroacoustic transducers that are spaced a predetermined distance in a sound transmitting medium, comprising the steps of generating an acoustic impulse with the first electroacoustic transducer and directed so as to pass through the workpiece to the second electroacoustic transducer; detecting the impulse with the second electroacoustic transducer; detecting a delayed image of the impulse with the second electroacoustic transducer; generating a first signal that is proportional to the elapsed time between the generation of the impulse by the first electroacoustic transducer and the detection of the impulse by the second electroacoustic transducer; generating a second signal that is proportional to the elapsed time between the detection of the impulse by the second electroacoustic transducer and the detection of the delayed image of the impulse by the second electroacoustic transducer, the second signal being proportional to the time required for sound to pass through the workpiece, generating a third signal that is proportional to the time which is required for sound to travel through the medium for the predetermined distance; generating a fourth signal that is proportional to the thickness of the workpiece by algebraically summing the first, second and third signals; and generating a signal that is proportional to the velocity of sound in the workpiece by combining the second and fourth signals according to a predetermined algebraic relationship.

6. A method for determining the velocity of sound in a workpiece that is positioned between first and second crystals that are spaced a predetermined distance in a sound transmitting medium comprising the steps of generating an acoustic impulse with the first crystal, the impulse being directed so as to pass through the workpiece to the sound crystal; detecting the impulse with the second crystal; detecting a delayed image of the impulse with the second crystal; generating a first signal that is proportional to the elapsed time between the generation of the impulse by the first crystal and the detection of the impulse by the second crystal; generating a second signal that is proportional to the elapsed time between the detection of the impulse by the second crystal and the detection of the delayed image of the impulse to the second crystal, the second signal being proportional to the time required for sound to pass through the workpiece; generating a third signal that is proportional to the time which is required for sound to travel through the medium for the predetermined distance; generating a fourth signal that is proportional to the thickness of the workpiece by algebraically summing the first, second and the third signals; and generating a signal that is proportional to the velocity of sound in the workpiece by algebraically dividing the fourth signal by the second signal.

* * * * *

PO-1050
(5/69)

UNITED STATES PATENT OFFICE
CERTIFICATE OF CORRECTION

Patent No. __3,690,155__  Dated __September 12, 1972__

Inventor(s) __Richard H. Eichler__

It is certified that error appears in the above-identified patent and that said Letters Patent are hereby corrected as shown below:

Column 3, line 27, "form" should read -- from --.
Column 4, line 6, "form" should read -- from --; line 15, "through the workpiece 10" should be deleted; Column 8, line 59, "impulse to the second" should read -- impulse by the second --.

Signed and sealed this 24th day of April 1973.

(SEAL)
Attest:

EDWARD M. FLETCHER, JR.
Attesting Officer

ROBERT GOTTSCHALK
Commissioner of Patents